United States Patent [19]

VanNortwick

[11] Patent Number: 5,225,224
[45] Date of Patent: Jul. 6, 1993

[54] PROCESS FOR FORMING CORN GRIT FOOD PRODUCTS

[76] Inventor: H. Christian VanNortwick, 1106 E. Rock Spring Rd., Greenville, N.C. 27857

[21] Appl. No.: 946,094

[22] Filed: Sep. 17, 1992

Related U.S. Application Data

[63] Continuation-in-part of Ser. No. 913,394, Jul. 15, 1992, abandoned.

[51] Int. Cl.⁵ .................... A23B 9/10; A23L 1/10
[52] U.S. Cl. .................... 426/549; 426/524; 426/619
[58] Field of Search ........... 426/549, 619, 524, 439

[56] References Cited

U.S. PATENT DOCUMENTS

| | | | |
|---|---|---|---|
| 3,278,311 | 10/1966 | Brown et al. | 426/808 |
| 3,925,563 | 12/1975 | Straughn et al. | 426/302 |
| 3,989,855 | 11/1976 | Jones | 426/524 |
| 4,073,958 | 2/1978 | Abe | 426/559 |
| 4,126,706 | 11/1978 | Hilton | 426/438 |
| 4,297,376 | 10/1981 | Nelson et al. | 426/94 |
| 4,623,550 | 11/1986 | Willard | 426/559 |
| 4,645,679 | 2/1987 | Lee, III et al. | 426/560 |
| 4,778,690 | 10/1988 | Sadel, Jr. et al. | 426/560 |
| 4,844,937 | 7/1989 | Wilkinson et al. | 426/559 |
| 5,137,749 | 8/1992 | Zukerman et al. | 426/524 |

Primary Examiner—Jeanette Hunter
Assistant Examiner—Mary S. Mims

[57] ABSTRACT

A high moisture content snack food prepared by heating corn grits in water and flavoring agents and thereafter cooling, shaping and quick freezing the product. In one embodiment the shaped product is fried before quick freezing.

19 Claims, 1 Drawing Sheet

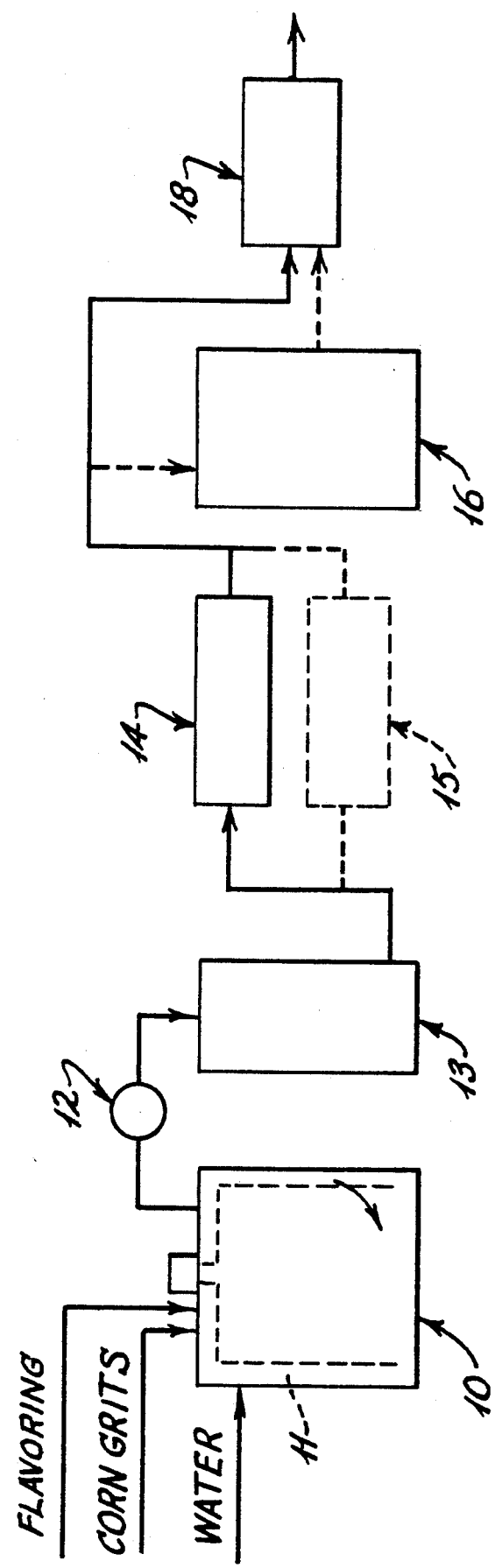

PROCESS FOR FORMING CORN GRIT FOOD PRODUCTS

CROSS-REFERENCE TO RELATED APPLICATION

This application is a continuation-in-part of applicant's previously filed application Ser. No. 07/913,394, filed Jul. 15, 1992, now abandoned, entitled PROCESS FOR FORMING CORN GRIT FOOD PRODUCTS.

BACKGROUND OF THE INVENTION

1. Field of the Invention

This invention is generally directed to a process of preparing food products from grains and, more specifically, to a process for preparing high moisture content snack foods from corn grits. The food products are extruded or molded into desired shapes which are readily microwaved or heated in conventional ovens or fryers after they have been processed and frozen for distribution. In the preferred embodiment, the corn grit snack food products are flavored utilizing conventional agents such as butter, cheddar cheese, ham and cajun spice.

2. History of the Related Art

The public acceptance of corn base snack food products is well-known with the most recognizable form of snack food being corn chips which are conventionally processed by blending white and yellow corn of the dent type with water and a percentage of lime which is heated and thereafter soaked for periods of hours. After soaking, the hulls are removed from the kernels and the kernels further ground and processed to form a dough which may be cut or shaped to the configuration of a desired end product, such as a chip, after which the product is fried in oil.

To date, numerous processes have been developed for changing the texture, taste, shape, and nutrient value of corn snack food products in an effort to increase consumer demand. By way of example, U.S. Pat. No. 4,297,376 to Nelson et al. discloses a snack food product which is molded into a three dimensional configuration and which is formed of a base corn dough which is extruded into a flat sheet, cut and then cooked in hot fat for a period of several minutes. In order to impart to the snack product a nutty flavor, sesame seeds are added to the corn dough before the dough is shaped and cooked.

In U.S. Pat. No. 3,925,563 to Straughn et al. another type of snack food product prepared from corn grits is disclosed in which finely ground particles of potato are added in amounts from 30% to 100% of the mix after which the materials are blended using a conventional rivet mixer. Liquid is added to raise the moisture level to between approximately 17% to 19% of the total mixture. The product is then allowed to temper for a period of up to two hours and then passed through a collet extruder. As the mixture is extruded at elevated temperatures it is puffed. The puffed product expands approximately 4 to 5½ times its original volume. The product is thereafter cut into appropriately sized pieces and toasted in an oven for several minutes.

U.S. Pat. 4,073,958 to Abe discloses a snack food product formulated utilizing a corn starch or waxy corn grit base to which is homogeneously mixed finely divided rice bran in order that the end product will have a flavor imparted to it from the rice bran.

Other examples of methods of manufacturing snack products from corn dough include U.S. Pat. Nos. 3,278,311 to Brown et al., 4,126,706 to Hilton, 4,623,550 to Willard, 4,778,690 to Sadel, Jr. et al., 4,844,937 to Wilkinson et al, and 5,100,686 to Hunt et al.

SUMMARY OF THE INVENTION

This invention is directed to a process for preparing food products and particularly frozen snack foods from corn grits. The snack food products are three dimensional, such as bite-sized discs or bar shaped, in configuration and are heated in a microwave or a conventional oven or fried for consumption.

The snack food products of the present invention are formed by mixing commercially available ground corn and/or regerminated, white or yellow or any ratio of both, corn grits with water to form a slurry in which various flavoring agents may be added in amounts between 4% to 6% by weight. The slurry is cooked at least at approximately 100° C. for a period of approximately six minutes and thereafter the slurry is cooled to a temperature of approximately 10° C. The products are thereafter formed into a desired shape by extrusion or by molding, with the shaped products thereafter either being fried or not and subsequently quickly frozen and prepared for shipment for consumer consumption. The products are fried before freezing if they are being prepared to be heated for consumption by microwave or baking. The non-fried products are prepared for consumption by frying at the point of service. Products being prepared for oven or microwave heating are fried in oil with the oil being maintained 175° to 210° C. prior to freezing. Frying time may vary but is generally less than one minute. The purpose of this initial frying is to "set" the desired product shape.

In the preferred embodiment, the corn grits are mixed in water at a ratio of two parts water to one part corn grits.

It is the primary object of the present invention to provide a high moisture (40-70%) snack food product formed of white/yellow or a combination of corn grits which is retained in a frozen state until the product is heated for consumption in a conventional microwave or oven or fryer.

It is yet a further object of the present invention to provide a snack food product formed of corn grits which is heated or cooked for consumption and which may be substituted for other types of heated breakfast or snack foods including, hash browns, toast, muffins, tarts, and similar food products.

It is yet another object of the present invention to provide healthful snack food products which may be economically prepared utilizing commercial corn grits and wherein the snack products may be maintained in a frozen state until the products are to be heated or cooked for consumption.

It is also an object of the present invention to provide a healthful snack food product formed of corn grits wherein the product may be flavor enhanced by the addition of agents such as cheese, butter, ham, onion, sour cream, cajun spice, and the like.

BRIEF DESCRIPTION OF THE DRAWINGS

FIG. 1 is a schematic block diagram showing the process steps of the present invention.

DESCRIPTION OF THE PREFERRED EMBODIMENT

The present invention is directed to a process for preparing high moisture content snack food products which may be served warm and which are formed from a base material of white/yellow or any combination of corn grits. The food products are not only designed for purposes of providing a healthful heated snack, but may also be utilized as side orders served in restaurants, cafeterias, hospitals, schools, and military mess halls.

The primary constituent of the present invention are corn grits which are ground to a table grade size which are readily commercially available. The grading may be changed without altering the inventive characteristics of the present invention depending upon the desired texture of the end product.

The grits are mixed with water in a ratio of approximately one part corn grits to two parts water by volume. Prior to adding the grits to the water, the water is heated to boiling, i.e. approximately 100° C., in a double-jacketed, steam kettle 10 equipped with a continuous side wall scraper 11. In order to vary the flavor of the end products, various flavor enhancers may be added to the slurry being mixed within the steam kettle 10. Examples of acceptable flavor enhancers include butter, cheddar cheese, ham, onion, sour cream, or cajun spice. The flavor enhancers are added at a ratio of between 4% to 6% by volume of the slurry.

The slurry is cooked for a period of approximately six minutes after which the slurry is conveyed by pump 12 through a continuous cool down line 13 until the temperature of the slurry reaches approximately 10° C. The cooled slurry is thereafter processed through an extruder 14 or, in the alternative, a forming or molding machine 15, in order to form the slurry into desired shapes, such as bite-sized discs, ovals, squares or other configurations. The cooled slurry is of a consistency such that, when it is formed by passing through an extruder or forming machine, the formed shapes are self-supporting. The extruded or formed shapes are thereafter either immediately frozen or pre-fried and then frozen utilizing a commercially available food product freezing apparatus 18. The frozen products are thereafter packaged in packaging machine (not shown), either in bulk or in separate portions. The resultant food products have a generally high moisture content, generally between 40-70%. If the products are being pre-fried for consumer reheating in microwave or conventional ovens, they are immersed for a period of generally less than one minute and preferably approximately forty-five seconds in a hot oil fryer 16 which is operated between 175° to 210° C. and, preferably, approximately 200° C. The oil utilized is preferably a high quality vegetable oil such as soy, corn, peanut, etc.

From the foregoing it will be noted that the product of the present invention is prepared in a very short period of time utilizing minimal energy output so that the food products obtained are economical to the consumer. The products prepared, including the step of pre-frying, are designed to be reheated for consumption and may be easily reheated in conventional microwave and other ovens. The time for reheating will depend upon the quantity of products being heated and the desired commercialized shape of the snack food product. The products prepared without pre-frying ar designed to be cooked in conventional fryers with the frying time depending upon the size and shape of the end product. By way of example, bite-sized discs approximately one inch in diameter and ¼ to ½ inch in thickness are prepared for consumption by frying for 2 to 2½ minutes.

I claim:

1. A process for preparing snack food products from corn grits comprising the steps of:
    a) mixing table grade corn grits in water which has been heated to at least approximately 100° C. to form a thick slurry;
    b) cooking the slurry at temperatures of at least approximately 100° C.;
    c) thereafter continuously cooling the slurry to a temperature of at least approximately 10° C.;
    d) forming the cooled slurry into a shaped product; and
    e) quick freezing the shaped product.

2. The process of claim 1 including the additional step of adding a flavor enhancer selected from a group of flavoring agents consisting of butter, cajun spices, ham, cheddar cheese, onion, and sour cream to the slurry being heated.

3. The process of claim 2 in which the flavor enhancer is added in an amount of between approximately 4.0% to 6.0% by volume of the slurry.

4. The process of claim 3 in which the corn grits are blended with the water in a ratio of approximately two parts water to one part corn grits.

5. The process of claim 1 in which the corn grits are blended with the water in a ratio of approximately two parts water to one part corn grits.

6. The process of claim 5 in which the slurry is cooked for a period of approximately six minutes.

7. The process of claim 6 in which the cooked slurry is continuously conveyed as it is cooled.

8. The process of claim 7 in which the cooled slurry is passed through an extruder and formed into shaped products.

9. The process of claim 7 in which the shaped product is fried prior to freezing.

10. The process of claim 9 in which the shaped product is fried by being immersed for not more than approximately one minute in oil heated to approximately 175° to 210° C.

11. The process of claim 10 in which the shaped product is fried by immersion for periods of at least forty-five seconds.

12. A process for preparing snack food products from corn grits comprising the steps of:
    a) mixing table grade corn grits in water which has been heated to at least approximately 100° C. to form a thick slurry;
    b) cooking the slurry at temperatures of at least approximately 100° C.;
    c) thereafter continuously cooling the slurry to a temperature of at least approximately 10° C.;
    d) forming the cooled slurry into a shaped product;
    e) frying the shaped product in oil; and
    f) quick freezing the fried shaped product.

13. The process of claim 12 including the additional step of adding a flavor enhancer selected from a group of flavoring agents consisting of butter, cajun spices, ham, cheddar cheese, onion, and sour cream to the slurry being heated.

14. The process of claim 13 in which the flavor enhancer is added in ah amount of between approximately 4.0% to 6.0% by volume of the slurry.

15. The process of claim 14 in which the corn grits are blended with the water in a ratio of approximately two parts water to one part corn grits.

16. The process of claim 12 in which the corn grits are blended with the water in a ratio of approximately two parts water to one part corn grits.

17. The process of claim 16 in which the slurry is cooked for a period of approximately six minutes.

18. The process of claim 17 in which the cooked slurry is continuously conveyed as it is cooled.

19. The process of claim 18 in which the cooled slurry is passed through an extruder and formed into shaped products.

* * * * *